UNITED STATES PATENT OFFICE.

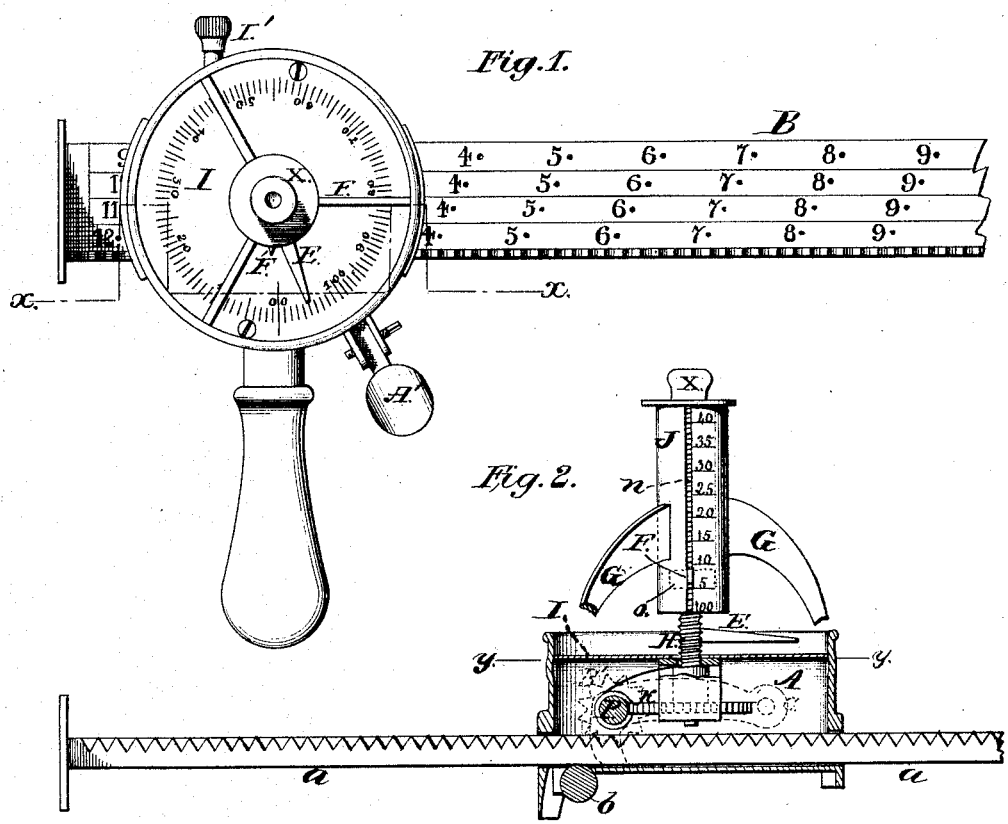

WILLIAM M. BULLOCK, OF LA GRANGE, INDIANA, ASSIGNOR OF ONE-HALF HIS RIGHT TO ADOLPHUS CUTTING, OF SAME PLACE.

IMPROVEMENT IN REGISTERING BOARD-RULES.

Specification forming part of Letters Patent No. 165,659, dated July 20, 1875; application filed February 3, 1875.

*To all whom it may concern:*

Be it known that I, WILLIAM M. BULLOCK, of La Grange, Indiana, have invented a Self-Registering Board-Rule, of which the following is a specification:

My invention relates to devices for measuring and recording the measurement of lumber and like materials; and it consists in a graduated bar and a sliding register, constructed substantially as hereinafter described, by means of which, when it is drawn or pushed along the rule, or the rule is drawn through it, the number of feet measured is indicated on a dial-plate, and, after a certain number of feet are indicated on the dial, the same are recorded upon a register.

In the accompanying drawing, Figure 1 represents a top view of the rule and registering device. Fig. 2 is a side view of the rule, or longitudinal section of the register, showing part of the registering mechanism, and a face view of the register; and Fig. 3 is a top view of the rule and a horizontal section of the register.

In the drawing, B represents an ordinary board-rule, with a rack-bar, a, on one side. This rule B passes through a cylinder or chamber, A, and may rest on the roller b, extending across the chamber. C is a bar extending across the chamber on the inside, and at or near its ends, on the under side, it is made considerably thicker than at other parts, or is provided with projections. On the inside of one of these projections is pivoted a lever, C', and through the other projection or thickness is passed a rod, c, on one end of which, and bearing against the bar C, is a spring. Between the rod c and the lever C', and having bearings in the two, is a worm-wheel, P, which meshes in the wheel K, that is on the lower end of the screw H. The screw H, between the wheel K and bar C, has a shoulder, which bears against the bar C, to prevent it (the screw) being raised, and thereby breaking the connection between the worm-wheel and the wheel K. The screw H passes through the dial-plate I and the register J, and has on its top a knob, X, on its lower end, just above the dial-plate, a hand, E, joined rigidly to it, and on that portion within the register J a nut, o, provided with a hand, F, which projects through a slot, n, extending from bottom to top of the register. I is the dial of the register, and is divided into one hundred spaces, each space representing one foot. The face of the register J, along the slot n, is divided into as many spaces as there are threads on the screw H between the top and bottom of the scale of the register J, and for each revolution of the hand E around the dial I the hand F of the register J is raised one point or space of the scale, and registers one hundred feet. On that end of the worm-wheel P nearest the lever C' is a pinion, B', which, at the proper time, is to gear with the rack on the side of the rule, for the purpose of communicating motion to the wheel K, in order to record the feet measured. Beneath and bearing against the lever C', at the end next the worm-wheel, is a spring, which is to keep the pinion from contact with the rack; and this lever, at the other end, is connected to a pivoted lever, D, which, when depressed at the thumb-piece A', lowers the pinion on the worm-wheel, and brings it into contact with the rack a. The pin I' passes through a slot in the side of the chamber A, and connects with the rod c, and when pushed to one side draws the worm-wheel back from the wheel K, and leaves it free. The pieces G connect the upright index J with the dial-plate, and prevent it from turning. A ratchet-wheel on one end of the worm-wheel prevents the wheel K from turning in another than one direction.

The teeth of the various wheels should be made to bear such a ratio to each other and the dial that, whatever number of feet are measured by the rule, the same shall be correctly indicated on the dial-plate.

The device is operated as follows: The rule is used in the usual way for measuring, and after the number of feet in length of the board are measured, so far as the capacity of the rule will permit, the registering device is drawn by the other hand up to the unit-point of the rule, or up to that point of the rule between which and the end of the rule the number of feet measured are indicated, when the lever D is depressed at A', which act brings the pinion-wheel B' to mesh with the rack a on the rule. The registering device is now moved to that figure on the rule indicating the number of feet measured, and the number of feet so represented is registered by means of the mechanism (described) on the dial-plate I; and after a certain number of feet are registered or indicated on the dial, say one hundred feet, which may be one revolution of the hand E around the dial, the same number of feet, by means hereinbefore described, are recorded on the upright register J.

This operation is repeated until the number of feet in the board or boards are measured and registered, when, assuming the boards to be of a uniform width, the total number of feet registered may be multiplied by the uniform width of the boards, and the number of superficial feet in the boards be thus ascertained.

When another lot of lumber is to be measured, the operator, by pressing the knob I' to one side, draws or pushes forward the bar or rod c, which breaks the connection between the worm-wheel and the wheel K, and then, by turning the knob X on top of the screw H, the nut and hand of the register J are brought to the bottom of the same, and the hand E being placed in proper position on the dial, the device is in condition to be used for the measurement.

Having described my invention, what I claim is—

1. The rule B, having a rack extending the length of its graduated scale, in combination with a sliding registering device having a dial-plate and a register, substantially as and for the purpose described.

2. The combination of the worm-wheel P and pinion B' with the sliding rod c, the lever C', and wheel K, substantially as and for the purpose set forth.

3. The worm-wheel P and pinion B', sliding rod c, and lever C', in combination with rule B, having rack a, and with wheel K, screw H, and register J, as and for the purpose set forth.

4. The screw H, provided with movable hand F and rigidly-attached hand E, in combination with register J, having longitudinal slot n, and with dial I and mechanism for operating screw, substantially as and for the purpose described.

WILLIAM M. BULLOCK.

Witnesses:
E. B. WIGENT,
RALPH ASHLEY.